US009253795B2

(12) United States Patent
Fan et al.

(10) Patent No.: US 9,253,795 B2
(45) Date of Patent: Feb. 2, 2016

(54) METHOD AND APPARATUS FOR SCHEDULING AN UPLINK DATA TRANSMISSION (75) Inventors: Jianke Fan, Espoo (FI); Seppo Alanara, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 903 days.

(21) Appl. No.: 13/357,180

(22) Filed: Jan. 24, 2012

(65) Prior Publication Data
US 2013/0182623 A1     Jul. 18, 2013

(30) Foreign Application Priority Data

Jan. 17, 2012 (GB) .................................. 1200706.8

(51) Int. Cl.
G08C 17/00 (2006.01)
H04W 72/12 (2009.01)
(Continued)

(52) U.S. Cl.
CPC .......... H04W 72/1284 (2013.01); H04W 4/005 (2013.01); *H04W 72/04* (2013.01)

(58) Field of Classification Search
CPC . H04W 72/04; H04W 72/1221; H04W 24/10; H04W 28/0278; H04W 72/0446; H04W 72/0413; H04W 72/1278; H04W 72/00; H04W 72/02; H04W 72/0406; H04W 76/048; H04W 72/14; H04L 47/30
USPC ................... 370/311, 329, 328, 352; 455/509
See application file for complete search history.

(56) References Cited

U.S. PATENT DOCUMENTS

2009/0225739 A1  9/2009 Yeo et al.
2010/0113082 A1* 5/2010 Ishii et al. ..................... 455/509
(Continued)

FOREIGN PATENT DOCUMENTS

CN     101242622 A     8/2008
CN     101873704 A     10/2010
(Continued)

OTHER PUBLICATIONS

3rd Generational Partnership Project; Technical Specification Group Radio Access Network; Evolved Universal Terrestrial Radio Access (E-UTRA); Physical Layer Procedures (Release 10), 3GPP TS 36.213 V10.4.0 (dated Dec. 2011) 125 pages.
(Continued)

Primary Examiner — Brian O'Connor
Assistant Examiner — Lionel Preval
(74) Attorney, Agent, or Firm — Oblon, McClelland, Maier & Neustadt, L.L.P.

(57) ABSTRACT

A method, apparatus and computer program product are provided to schedule the uplink grant in a manner that efficiently utilizes uplink resources. In the context of a method from the perspective of the user equipment, an indication regarding data to be transmitted is received and a scheduling request is caused to be provided via a control channel. The scheduling request is configured to indicate a size of the data to be transmitted. In response to a grant, data may be caused to be transmitted via allocated uplink resource blocks. In the context of a method from the perspective of a base station, a scheduling request including an indication of the requested size of the uplink grant is received via a control channel. The method may cause the grant to be provided to a user equipment and, in response, may receive data from the user equipment via allocated uplink resource blocks.

18 Claims, 8 Drawing Sheets (51) Int. Cl.
*H04W 4/00* (2009.01)
*H04W 72/04* (2009.01)

(56) References Cited

U.S. PATENT DOCUMENTS

| | | | |
|---|---|---|---|
| 2010/0135233 A1* | 6/2010 | Ono | 370/329 |
| 2011/0274044 A1* | 11/2011 | Park et al. | 370/328 |
| 2012/0327799 A1* | 12/2012 | Sandlund et al. | 370/252 |
| 2013/0089057 A1* | 4/2013 | Worrall et al. | 370/329 |
| 2013/0163532 A1* | 6/2013 | Anderson et al. | 370/329 |
| 2013/0163537 A1* | 6/2013 | Anderson et al. | 370/329 |
| 2014/0105164 A1* | 4/2014 | Moulsley et al. | 370/329 |

FOREIGN PATENT DOCUMENTS

| | | |
|---|---|---|
| EP | 2 166 810 A2 | 3/2010 |
| WO | WO 2009/045026 A2 | 4/2009 |
| WO | WO 2013/067677 A1 | 5/2013 |

OTHER PUBLICATIONS

*3rd Generational Partnership Project; Technical Specification Group Radio Access Network; LTE RAN Enhancements for Diverse Data Applications*(Release 11), 3GPP TR 36.822 V0.2.0 (dated Nov. 2011) 33 pages.

*3rd Generational Partnership Project; Technical Specification Group Radio Access Network; Evolved Universal Terrestrial Radio Access (E-UTRA)Radio Resource Control (RRC); Protocol Specification*(Release 8), 3GPP TS 36.331 (dated Dec. 2007) 56 pages.

*PUCCH Evaluation*, R2-113222, 3GPP TSG-RAN WG2 Meeting #74 (dated May 11-15, 2011) 5 pages.

*Consideration on the Bandwidth Reduction for Low Cost MTC UE*, R1-113659, 3GPP TSG RAN WG1#67 (dated Nov. 14-18, 2011) 6 pages.

Search Report for Great Britain Patent Application No. 1200706.8, dated May 28, 2012.

* cited by examiner

METHOD AND APPARATUS FOR SCHEDULING AN UPLINK DATA TRANSMISSION

CROSS REFERENCE TO RELATED APPLICATION

This application claims priority to and the benefit of United Kingdom Application No. 1200706.8 filed on Jan. 17, 2012, the entire contents of which are incorporated herein by reference.

TECHNOLOGICAL FIELD

An example embodiment of the present invention relates generally to uplink data transmissions and, more particularly, to the scheduling of uplink data transmissions.

BACKGROUND

User equipment, such as mobile terminals, frequently transmit data via an uplink to a network via a base station, such as a Node B, an evolved Node B (eNB) or other access point. For example, machine-type communications (MTC) that are supported by user equipment may transmit data to a network via the uplink to a base station. The data to be transmitted via an uplink may vary depending upon the MTC application that is providing the data. For example, MTC applications may provide data to be transmitted via the uplink on a periodic basis or on a non-periodic basis. In this regard, MTC applications for metering, fleet management and civilian surveillance may periodically transmit data via an uplink. Conversely, MTC applications for earthquake and tsunami warning systems may transmit data via an uplink on a non-periodic basis. In addition, MTC applications may provide large packets of data or small packets of data to be transmitted via an uplink. In this regard, the majority of MTC applications may transmit relatively small data packets. However, some MTC applications, such as those for surveillance systems, may transmit larger data packets, particularly in instances in which the surveillance systems utilize high definition video.

MTC applications are not the only applications that provide data via an uplink to a base station. In this regard, user equipment may also receive data from background applications to be transmitted to a network via an uplink. In this regard, background applications are applications that provide data to be transmitted via the uplink without any user activity. The data provided by background applications may be intermittent, and the packets may be relatively small with a maximum size, for example, of about 200 bytes.

In a Long-Term Evolution (LTE) or LTE-Advanced (LTE-A) system, the user equipment and a base station, such an eNB, communicate regarding data to be provided via the uplink utilizing a one-bit scheduling request (SR) and buffer status reports (BSR). In this regard, the SR may be transmitted via a control channel, such as the physical uplink control channel (PUCCH) or the random access channel (RACH), while the BSR is transmitted on a data channel, such as the physical uplink shared channel (PUSCH), generally together with the data itself. The SR may be configured to have a period and one subframe offset. In this regard, the period of the SR may be 1 ms, 2 ms, 5 ms, 10 ms, 20 ms, 40 ms or 80 ms. As such, the user equipment, upon receipt of data to be transmitted via the uplink, such as from an MTC application or from a background application, would issue an SR to request the uplink resource for data transmission.

As a result of the variations in the timing with which data is received by the user equipment for transmission via the uplink and the variations in the size of the data to be transmitted via the uplink, the utilization of the uplink may not always be efficient. In this regard, the uplink may have a size that may sometimes be mismatched, such as by being bigger or smaller, than the size of the data to be transmitted via the uplink.

BRIEF SUMMARY

A method, apparatus and computer program product are therefore provided according to an example embodiment in order to schedule the uplink grant in a manner that provides for more efficient utilization of the uplink. In this regard, the method, apparatus and computer program product of an example embodiment may cause the uplink grant to be scheduled such that the resulting uplink grant has a size that is generally in alignment with the quantity of data to be transmitted via the uplink. Additionally, the method, apparatus and computer program product of one example embodiment may buffer the data to be transmitted via the granted uplink resource blocks prior to requesting the uplink grant in order to control the number of or frequency with which requests for the uplink grant are made and to increase the likelihood that any uplink resource that is granted will be efficiently utilized.

In one embodiment, a method is provided that includes receiving an indication regarding data to be transmitted and causing a scheduling request to be provided via a control channel. In this regard, the scheduling request is configured to indicate a size of the data to be transmitted. In response to a grant, the method may also cause the data to be transmitted via allocated uplink resource blocks.

In another embodiment, an apparatus is provided that includes at least one processor and at least one memory including computer program code with the at least one memory and the computer program code being configured to, with the processor, cause the apparatus to at least receive an indication regarding data to be transmitted. The at least one memory and the computer program code of one embodiment are also configured to, with the processor, cause the apparatus to cause a scheduling request to be provided via a control channel. In this regard, the scheduling request is configured to indicate a size of the data to be transmitted. The at least one memory and the computer program code may be further configured to, with the processor, cause the apparatus to cause, in response to a grant, the data to be transmitted via allocated uplink resource blocks.

In a further embodiment, a computer program product is provided that includes at least one non-transitory computer-readable storage medium having computer-readable program instructions stored therein with the computer-readable program instructions including program instructions configured to receive an indication regarding data to be transmitted. The computer-readable program instructions of one embodiment also include program instructions configured to cause a scheduling request to be provided via a control channel. In this regard, the scheduling request is configured to indicate a size of the data to be transmitted. The computer-readable program instructions of one embodiment also include program instructions configured to cause, in response to a grant, the data to be transmitted via allocated uplink resource blocks.

In yet another embodiment, an apparatus is provided that includes means for receiving an indication regarding data to be transmitted and means for causing a scheduling request to be provided via a control channel. In this regard, the scheduling request is configured to indicate a size of the data to be transmitted. In response to a grant, the apparatus may also include means for causing the data to be transmitted via allocated uplink resource blocks.

In one embodiment, a method is provided that includes receiving a scheduling request that is provided via a control channel. In this regard, the scheduling request is configured to indicate a size of an uplink grant that is requested. The method of one embodiment also causes the grant to be provided to a user equipment and, in response to the grant, receives data from the user equipment via allocated uplink resource blocks.

In another embodiment, an apparatus is provided that includes at least one processor and at least one memory including computer program code with the at least one memory and the computer program code being configured to, with the processor, cause the apparatus to at least receive a scheduling request that is provided via a control channel. In this regard, the scheduling request is configured to indicate a size of an uplink grant that is requested. The at least one memory and the computer program code of one embodiment are also configured to, with the processor, cause the apparatus to cause the grant to be provided to a user equipment and, in response to the grant, receive data from the user equipment via allocated uplink resource blocks.

In a further embodiment, a computer program product is provided that includes at least one non-transitory computer-readable storage medium having computer-readable program instructions stored therein with the computer-readable program instructions including program instructions configured to receive a scheduling request that is provided via a control channel. In this regard, the scheduling request is configured to indicate a size of an uplink grant that is requested. The computer-readable program instructions of one embodiment also include program instructions configured to cause the grant to be provided to a user equipment and, in response to the grant, receive data from the user equipment via allocated uplink resource blocks.

In yet another embodiment, an apparatus is provided that includes means for receiving a scheduling request that is provided via a control channel. In this regard, the scheduling request is configured to indicate a size of an uplink grant that is requested. The apparatus of one embodiment also includes means for causing the grant to be provided to a user equipment and means, in response to the grant, for receiving data from the user equipment via allocated uplink resource blocks.

BRIEF DESCRIPTION OF THE DRAWINGS

Having thus described certain example embodiments of the present disclosure in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Figure 1:
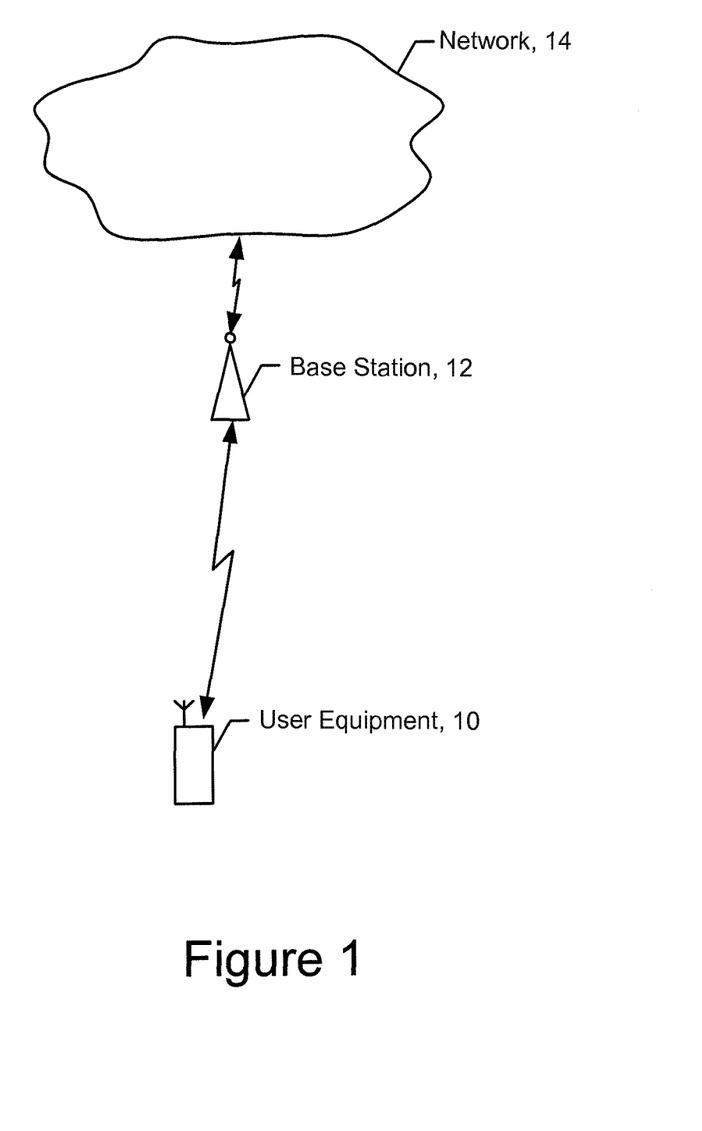
FIG. 1 is an illustration of a system depicting communications between user equipment and a base station in which the uplink between the user equipment and the base station may be scheduled in accordance with an example embodiment of the present invention.

Referring now to FIG. 1, a system that supports communications between user equipment 10 and a network 14, such as an LTE network, an LTE-A network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network, via a base station 12 is shown. Various types of user equipment may be employed including, for example, a mobile communication device such as, for example, a mobile telephone, portable digital assistant (PDA), pager, laptop computer, or any of numerous other hand held or portable communication devices, computation devices, content generation devices, content consumption devices, or combinations thereof. Regardless of the type of user equipment, the user equipment may communicate with the network via a base station, such as a Node B, an eNB or other type of access point.

The communications between the user equipment 10 and the base station 12 may include the transmission of data via an uplink that is granted between the user equipment and the base station. The data to be transmitted via the uplink may be provided to the user equipment by various applications including MTC applications, such as metering, fleet management, civilian surveillance and earthquake or tsunami warning applications, and by background applications that provide data to be transmitted via the uplink without the requirement for any user activity. These applications may provide data to be transmitted via the uplink on either a periodic basis or a non-periodic basis. Additionally, the data provided by these applications for transmission via the uplink may have a relatively small packet size or, in some instances, a larger packet size. Regardless, the user equipment and the base station may implement example embodiments of the method, apparatus and computer program product in order to grant the uplink in response to a scheduling request from the user equipment in a manner that makes efficient use of the uplink.

Figure 2:
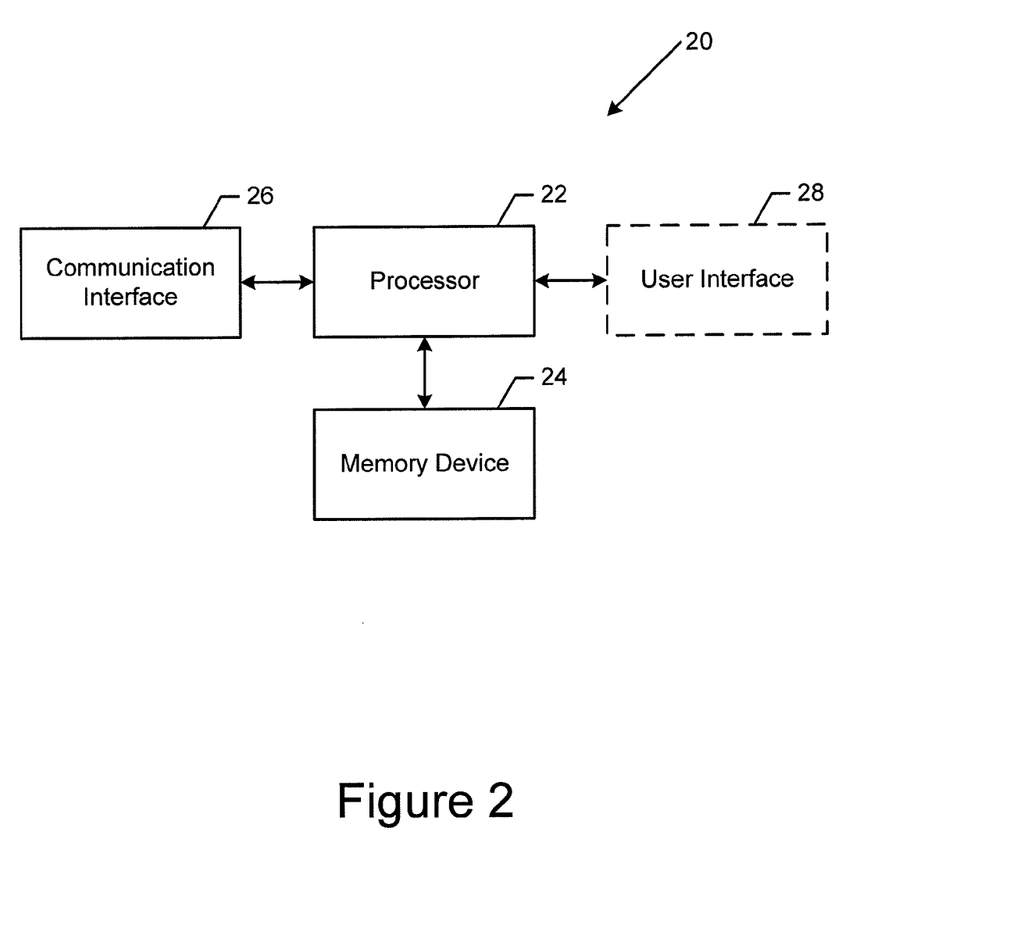
FIG. 2 is a block diagram of an apparatus that may be configured in accordance with an example embodiment of the present invention.

As such, the user equipment 10 and a network entity, such as the base station 12, may each embody or otherwise be associated with an apparatus 20 that is generally depicted in FIG. 2 and that may be configured in accordance with an example embodiment of the present invention as described below, such as in conjunction with FIG. 3 from the perspective of the user equipment and FIG. 8 from the perspective of the base station. However, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with a processing system including, for example, processing circuitry that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 22 and memory 24 that may be in communication with or otherwise control a communication interface 26 and, in some cases in which the apparatus is embodied by the user equipment 10, a user interface 28. As such, the processing circuitry may be embodied as a circuit chip (e.g., an integrated circuit chip) configured (e.g., with hardware, software or a combination of hardware and software) to perform operations described herein. However, in some embodiments taken in the context of the user equipment or the base station 12, the processing circuitry may be embodied as a portion of user equipment or the base station.

The user interface 30 (if implemented in embodiments of the apparatus 20 embodied by the user equipment 10) may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. In one embodiment, the user interface includes user interface circuitry configured to facilitate at least some functions of the user equipment by receiving user input and providing output.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry, such as between the user equipment 10 and the base station 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 24 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 22. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 22 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 24 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 3:
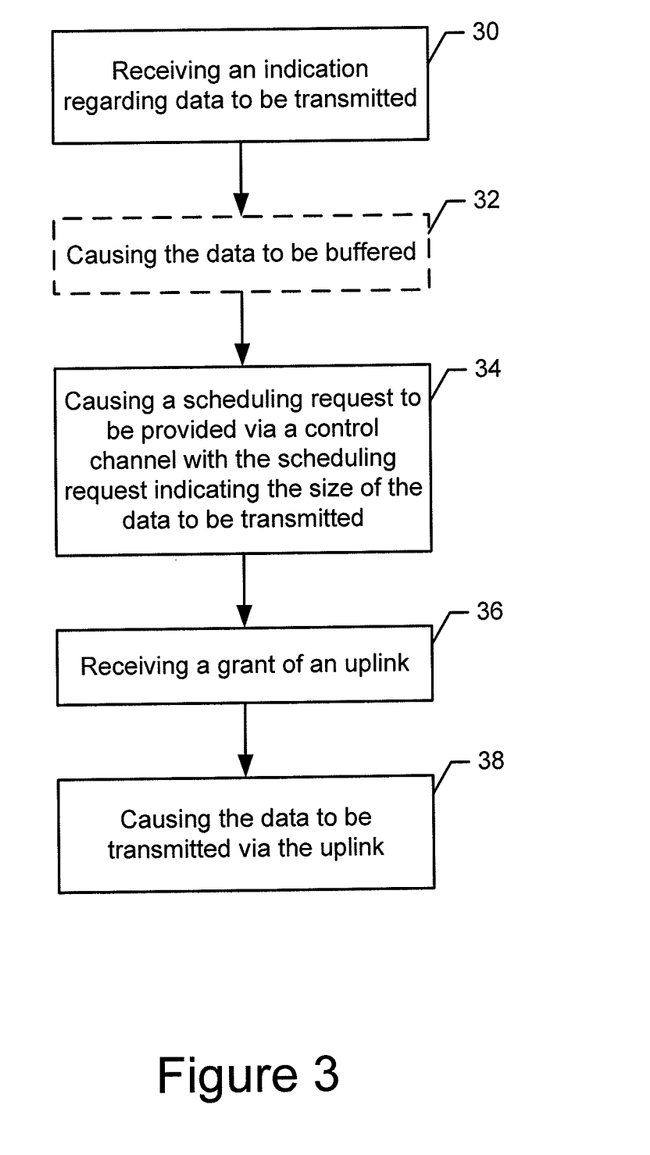
FIG. 3 is a flowchart depicting the operations performed by an apparatus embodied by or otherwise associated with the user equipment in accordance with one embodiment of the present invention.
Figure 6:
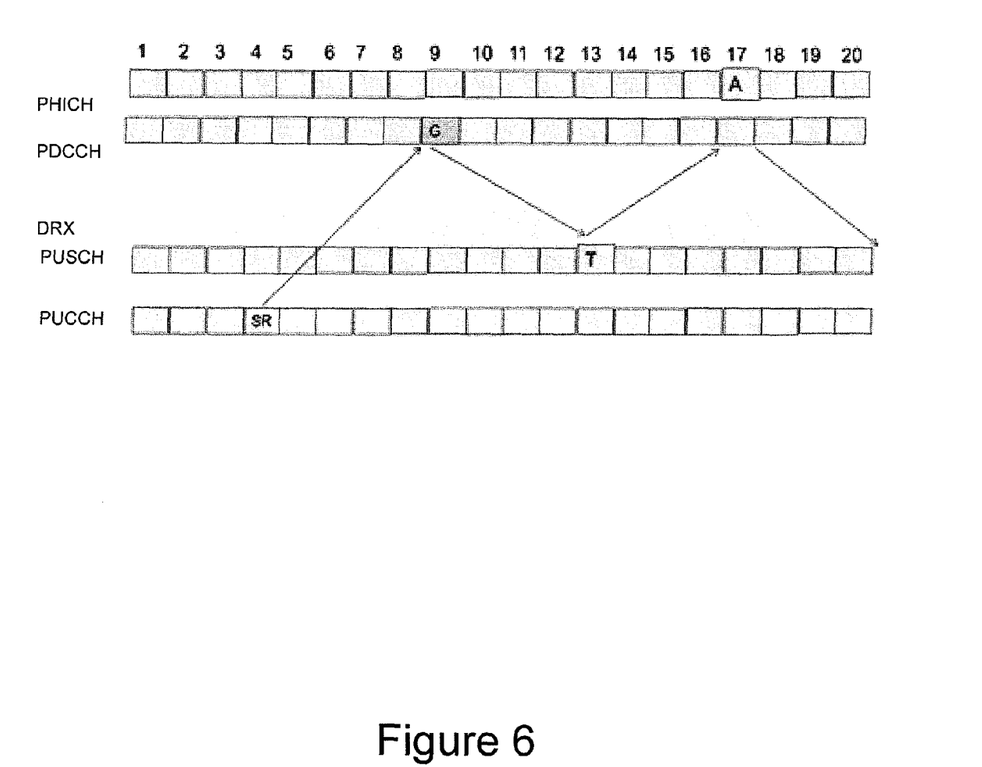
FIG. 6 is an illustration of the issuance of a scheduling request (SR) and the subsequent issuance of a grant (G) in accordance with one embodiment of the present invention.

FIGS. 3 and 6 are flowcharts illustrating the operations performed by a method, apparatus and computer program product, such as apparatus 20 of FIG. 2, from the perspective of the user equipment 10 and the base station 12, respectively, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3 and 6, when executed, convert a computer or processing circuitry into a particular machine configured to perform an example embodiment of the present invention. Accordingly, the operations of FIGS. 3 and 6 define an algorithm for configuring a computer or processing circuitry, e.g., processor, to perform an example embodiment. In some cases, a general purpose computer may be provided with an instance of the processor which performs the algorithm of FIGS. 3 and 6 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included as shown, for example by the dashed lines in FIG. 3. It should be appreciated that each of the modifications, optional additions or amplifications below may be included with the operations above either alone or in combination with any others among the features described herein.

Referring now to FIG. 3, the operations performed by a method, apparatus and computer program product of an example embodiment are illustrated from the perspective of an apparatus 20 that may be embodied by or otherwise associated with the user equipment 10. In this regard, the apparatus may include means, such as the processing circuitry, the processor 22, the communications interface 26 or the like, for receiving an indication regarding data to be transmitted via an uplink to the base station 12 and, in turn, to the network 14. See block 30 of FIG. 3. The indication that is received may be provided by the receipt of the data itself. In this regard, the apparatus, such the processing circuitry, the processor, the communication interface or the like, may receive the indication regarding the data to be transmitted via the uplink by receiving the data to be transmitted via the uplink.

The data may be received from a variety of different sources. For example, the data may be received from various MTC applications or from various background applications supported by the user equipment 10. The data that is received for subsequent transmission via the uplink may be received on a periodic basis or on a non-periodic basis. For example, data provided by MTC applications relating to metering, fleet management and civilian surveillance may be provided on a periodic basis, while data provided by MTC applications relating to earthquake or tsunami warning systems may be provided on a non-periodic basis. In addition, the data that is received may have a relatively small packet size or, alternatively, a larger packet size. In this regard, while the MTC applications relating to metering and fleet management may provide data having a relatively small packet size, other applications, such as MTC applications relating to surveillance, may provide data having a larger packet size.

Although the apparatus 20 embodied or otherwise associated with the user equipment 10 may issue a scheduling request for the uplink grant immediately in response to the receipt of an indication of data to be transmitted via the uplink, the apparatus of one embodiment may optionally defer the scheduling request as described below and, as such, may optionally cause the data that is received to be buffered, such as by being stored in the memory device 24, prior to causing the scheduling request to be provided. See block 32. As such, the apparatus embodied by the user equipment may include means, such as the processing circuitry, the processor 22, the memory device or the like, for causing the data that is received to be buffered prior to causing the scheduling request to be provided. As described below, the data may be buffered, for example, for a time that is equal to a plurality of transmission periods of the user equipment, that extends until the next DTX On period or until the next burst of a large amount of data.

By way of example, data that is to be transmitted via the uplink may be received on a periodic basis with the data having a small packet size. As such, the apparatus 20, such as the processing circuitry, the processor 22, the memory device 24 or the like, may cause the data that is received for a plurality of periods to be buffered prior to causing a scheduling request to be provided in order to schedule an uplink grant via which the data accumulated over the plurality of periods may be transmitted. By buffering the data, the number of scheduling requests and, accordingly, the number of uplink grants may be conserved. In another embodiment, the data that is received by the user equipment 10 for transmission via the uplink may be received on a non-periodic basis, but may also have a relatively small packet size. Although the scheduling request may be provided in a periodic manner in this embodiment, the data that is received on a non-periodic basis prior to the provision of the scheduling request may be buffered such that the resulting uplink grant may support the transmission of all of the data that has been received during the most recent period. Even in instances in which the data is provided on a non-periodic basis, but has a size that varies from relatively small data packets to moderately large data packets, such as the data packets for gaming or background data traffic, the apparatus, such as the processing circuitry, the processor, the memory device or the like, may cause the data that is received in a non-periodic basis to be buffered, such as for a predefined period of time, prior to causing the scheduling request to be issued in order to transmit the accumulated data.

Figure 4:
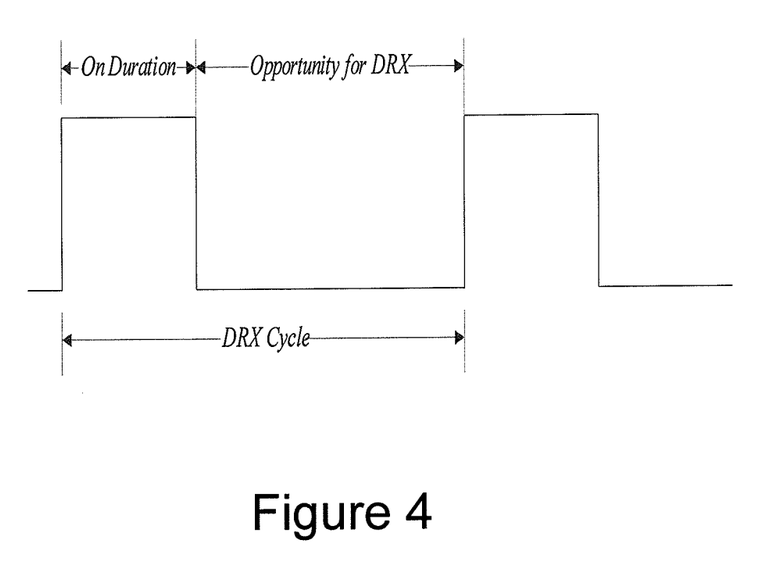
FIG. 4 illustrates a DRX cycle including a DRX "On" period and an "Opportunity for DRX" period.

The apparatus 20 may also include means, such as the processing circuitry, the processor 22, the communication interface 26 or the like, for causing a scheduling request to be provided via a control channel. See block 34 of FIG. 3. As described below, the scheduling request may be provided in accordance with one example embodiment during a discontinuous reception (DRX) "On" period via a physical uplink control channel (PUCCH). See FIG. 4 that illustrates a DRX cycle including a DRX "On" period and an "Opportunity for DRX" period. The scheduling request may be configured to indicate the size of the data to be transmitted via the uplink. The scheduling request may be configured in various manners to provide an indication of the size of the uplink.

Figure 5:
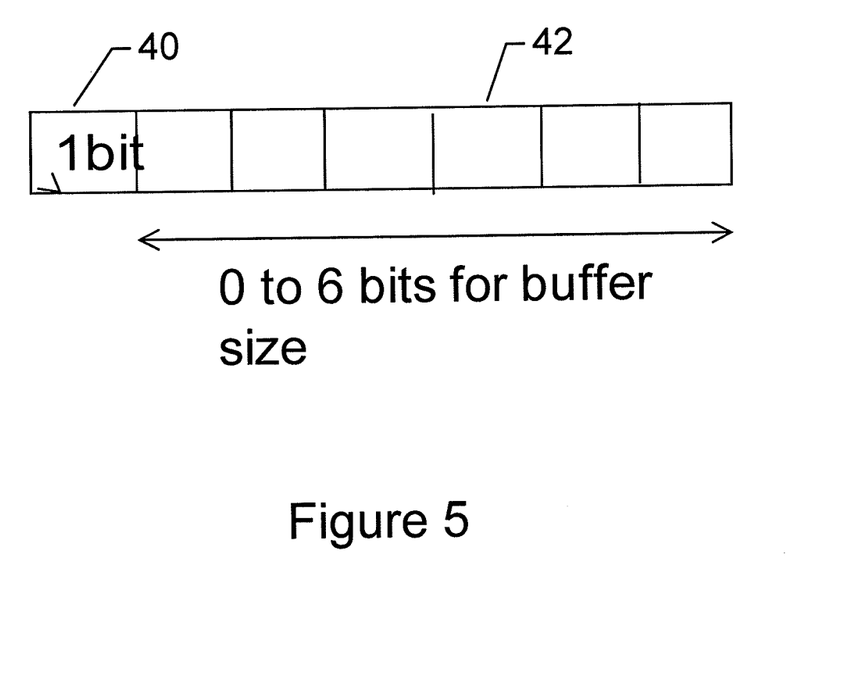
FIG. 5 is an illustration of a scheduling request that includes an indication of the size of the uplink grant that is requested in accordance with one embodiment of the present invention.

For example, the scheduling request may include an indication as to whether the uplink grant that is requested has a first size or a second size, larger than the first size. In this embodiment and as shown in FIG. 5, the scheduling request may include a single control bit 40, e.g., an on/off bit, that may alternatively have a first state indicative of the request for the grant of an uplink having a first size, such as the size of a conventional legacy uplink grant, or a second state indicative of the request for the uplink grant having a second size that is different than the first size, such as by being larger than the conventional legacy uplink grant. In this regard, the second size may be predefined, such as by being selected by the network operator or by being specified by the operational standards. However, in addition to or instead of a binary indication that the size of the uplink grant that is being requested is one of two different sizes, the scheduling grant may include an indication of the size of the grant that is requested by reference to a plurality of predefined size values. In one embodiment, the scheduling request may include the binary indication provided by a control bit as described above that may indicate that the size of the uplink grant is the same as in a conventional legacy grant or a second size that is different than the conventional legacy grant as well as one or more additional bits 42 that may be associated with a predefined size value. As such, in an instance in which the scheduling request indicates that the requested uplink grant is to have a second size that is larger than the conventional legacy grant, the one or more additional bits may define the size of the requested uplink grant.

By way of example, a table of predefined size values may be stored or otherwise accessible by the user equipment 10 and the base station 12. One example of a list of predefined size values is provided below with a range of buffer sizes (in bytes) being associated with each index.

| Index | Buffer Size (BS) value [bytes] |
| --- | --- |
| 0 | BS = 0 |
| 1 | 0 < BS <= 10 |
| 2 | 10 < BS <= 12 |
| 3 | 12 < BS <= 14 |

-continued

| Index | Buffer Size (BS) value [bytes] |
| --- | --- |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

As such, the scheduling request of this embodiment may include additional bits 42 that provide an indication of the predefined size value by providing the index associated with a respective buffer size value. In this regard, the predefined size value may then equal the upper end of the corresponding range of buffer size values, e.g., an index of 10 would correspond to a predefined size value of 42 bytes in this embodiment. In order to individually identify each of the 64 buffer size values of the foregoing example, the scheduling request may include 6 additional bits that may have values from 0 to 63 in order to identify the indices associated with the buffer size values and, accordingly, the size of the uplink grant.

The scheduling requests of other embodiments may include indications that individually identify more or less predefined size values than the 64 predefined size values of the foregoing example. For example, the scheduling request may include a single additional bit 42 to identify two different predefined size values. Alternatively, the scheduling request may include two additional bits for individually identifying four different predefined size values, or three additional bits for individually identifying eight different predefined size values. Thus, the size of the scheduling request may depend upon the number of different predefined size values that are to be provided.

In one embodiment, the apparatus 20, such as the processing circuitry, the processor 22, the communications interface 26 or the like, may be configured to cause the scheduling request to be provided during the DRX "On" period during which the user equipment 10 monitors a control channel, such as the physical downlink control channel (PDCCH), of a DRX cycle. See, for example, FIG. 4. As shown in FIG. 6, for example, a scheduling request (SR) that is caused to be provided during the DRX "On" period may be transmitted, such as via the PUCCH. A grant (G) may subsequently be issued by the base station 12 to the user equipment 10 via, for example, the PDCCH and the data, in turn, may be caused to be transmitted (T) via the uplink to the base station, such as via the PUSCH, during the DRX "On" period. The base station may, in turn, issue an acknowledgement (A) of the data, such as via the physical hybrid automatic repeat request (HARM) indicator channel (PHICH).

Figure 7A:
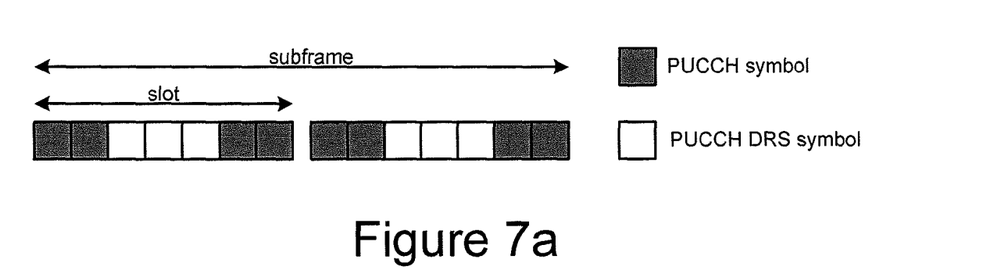
FIGS. 7a, 7b and 7c are mappings of the symbols for PUCCH formats 1, 1a and 1b in one subframe.
Figure 7B:
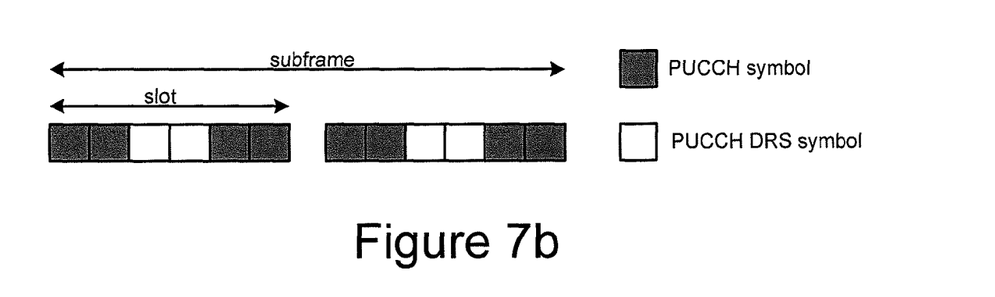
Figure 7C:
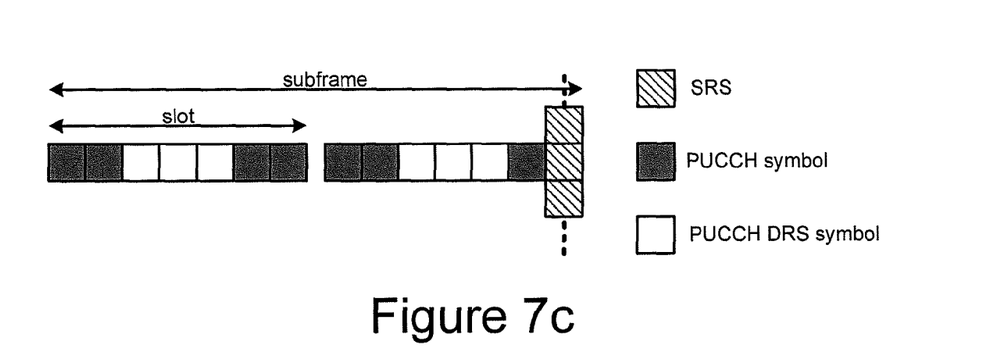

As also noted above, the scheduling request may be caused to be provided by the user equipment 10 via a control channel, such as the PUCCH. In this regard, PUCCH format 1 includes one available bit and PUCCH formats 1a and 1b include two available bits. In this regard, PUCCH formats 1, 1a and 1b utilize four single carrier frequency division multiple access (SC-FDMA) symbols per slot. In an instance of a current system in which a normal cyclic prefix is utilized, the remaining three symbols as shown in FIG. 7a (or the remaining two symbols in the instance of an extended cyclic prefix (CP) as shown in FIG. 7b) are utilized for the PUCCH demodulation reference signal (DRS). In an instance of a current system in which the sounding reference signal (SRS) overlaps the PUCCH symbols, only three symbols are utilized in the second slot of the subframe as shown, for example, in FIG. 7c. Additional bits from among the available four symbols per slot may be utilized for the scheduling requests of the example embodiment. For example, embodiments of the present invention that utilize the scheduling request having only a control bit or a scheduling request having a control bit and one additional bit may be transmitted utilizing PUCCH formats 1a or 1b without HARQ acknowledgement (ACK) information bits. For other embodiments of the scheduling request, such as those embodiments that include a control bit and two or more additional bits that provide for an indication of the buffer size, a PUCCH format, such as a new PUCCH format 1c, that allots a plurality of symbols, such as four symbols, in the subframe for the scheduling request and no more than a predefined number of symbols, such as only two symbols, in each slot for the DRS may be employed. In this embodiment and in an instance in which the SRS overlaps the PUCCH symbols, only one symbol may be utilized in the second slot of the subframe for the DRS.

Alternatively, in an instance in which the scheduling request only includes a single control bit, slot-based transmission may use PUCCH format 1. In this regard and in an instance in which the control bit of the scheduling request is to indicate a second or larger request, the scheduling request may be provided in the first slot, while in an instance in which the control bit of the scheduling request is to request the first or smaller size, the scheduling request may be provided in the second slot. Still further, the control bit of a scheduling request may be sent in both slots of the subframe in order to provide an indication that the buffer size has a third predefined size, thereby providing three alternative sizes using slot-based transmission.

As shown in FIG. 6, in response to the scheduling request, the apparatus 20 embodied by the user equipment 10 may include means, such as the processing circuitry, the processor 22, the communication interface 26 or the like, for receiving an uplink grant from the base station 12. See block 36 of FIG. 3. The apparatus embodied or otherwise associated with the user equipment may, in turn, include means, such as the processing circuitry, the processor, the communication interface or the like, for causing the transmission of the data via the uplink identified by the grant. See block 38. Based upon the indication of the buffer size and, in turn, the size of the uplink for which a grant is requested, the uplink grant may be appropriately sized so as to receive the data that has been buffered by the user equipment, while not being overly large with a size much greater than the data to be transmitted by the user equipment. Thus, the method, apparatus and computer program product of one embodiment may provide for the efficient transmission of data via the uplink.

Figure 8:
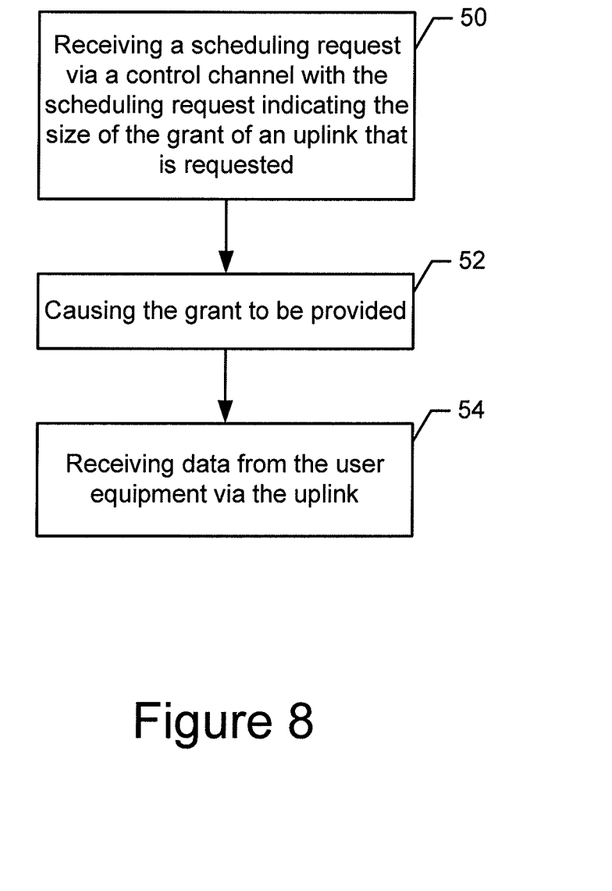
FIG. 8 is a flowchart depicting the operations performed by an apparatus embodied by or otherwise associated with the base station in accordance with one embodiment of the present invention.

Referring now to FIG. 8, the operations performed by an apparatus 20 that is embodied by or otherwise associated with the base station 12 in accordance with an example embodiment of the present invention are illustrated. In this regard, the apparatus may include means, such as the processing circuitry, the processor 22, the communications interface 26 or the like, for receiving a scheduling request, such as via a control channel, e.g., the PUCCH. See block 50 of FIG. 8. As described above, the scheduling request is configured to indicate the size of the uplink grant that is requested. The apparatus embodied by or otherwise associated with the base station may also include means, such as the processing circuitry, the processor, the communications interface or the like, for causing the grant to be provided to the user equipment 10. See block 52. In this regard, the uplink grant may be sized in accordance with the size indicated by the scheduling request, such as by having a size that is at least as large as the size indicated by the scheduling request, but not much larger than the size indicated by the scheduling request.

By way of example in which PDCCH format 0 is utilized, a band with a 20 megahertz bandwidth may use 100 resource blocks (RBs). In this regard, the resource allocation information provided by the grant may indicate to the user equipment 10 a set of contiguously allocated virtual resource block indices denoted by $n_{VRB}$. A resource allocation field in the grant may include a resource indication value (RIV) corresponding to the starting resource block $RB_{START}$ and a length in terms of the contiguously allocated resource block $L_{CRBs} \geq 1$. The resource indication value may be defined in accordance with one embodiment as follows:

$$\text{if } (L_{CRBs} - 1) \leq \lfloor N_{RB}^{UL}/2 \rfloor \text{ then}$$
$$RIV = N_{RB}^{UL} (L_{CRBs} - 1) + RB_{START}$$
$$\text{else}$$
$$RIV = N_{RB}^{UL} (N_{RB}^{UL} - L_{CRBs} + 1) + (N_{RB}^{UL} - 1 - RB_{START})$$

wherein the uplink bandwidth configuration is expressed in multiples of $N^{UL}_{RB}$. Based upon the size of the grant that is requested by the scheduling request, the apparatus, such as the processing circuitry, the processor, the communication interface or the like, embodied by the base station may define the length of the resource block grant by $L_{CRBs}$.

The apparatus 20 embodied by the base station 12 may also include means, such as the processing circuitry, the processor 22, the communication interface 26 or the like, for receiving data from the user equipment 10 via the uplink that was established in response to the grant. See block 54 of FIG. 8. As described above, the user equipment may have buffered the data provided by various applications, such as MTC applications, background applications or the like, and, as such, may issue fewer scheduling requests, but may transmit larger amounts of data by sizing the uplink grant in response to the scheduling request and, more particularly, in response to the indication of the size of the uplink grant that is requested that is provided with or otherwise in association with the scheduling request. The uplink resources may therefore be utilized in an efficient manner, while still providing for the uplink data transmissions from the various applications supported, in turn, by the user equipment 10.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for operating a user equipment, the method comprising:
   receiving, at the user equipment over a plurality of transmission periods, data to be transmitted;
   buffering the received data;
   deferring until a next discontinuous transmission ON period following the plurality of transmission periods a scheduling request to be provided by the user equipment via a physical uplink control channel (PUCCH), wherein the scheduling request is configured to indicate a size of the buffered data to be transmitted; and
   in response to a grant, causing the buffered data to be transmitted from the user equipment via allocated uplink resource blocks,
   wherein the scheduling request comprises a control bit and two or more additional bits that provide an indication of the size of the buffer data to be transmitted, and wherein the scheduling request is provided in accordance with a physical uplink control channel (PUCCH) format that allots a plurality of symbols in a subframe for the scheduling request.

2. The method according to claim 1, wherein the scheduling request comprises an indication of whether the buffer data to be transmitted is a first size or a second size, larger than the first size.

3. The method according to claim 1, wherein the scheduling request comprises an indication of a size of the buffer data to be transmitted that is requested by reference to a plurality of predefined size values.

4. The method according to claim 1, wherein receiving the data comprises receiving the data on a periodic basis.

5. The method according to claim 1, wherein no more than a predefined number of symbols in each slot are utilized for a PUCCH demodulation reference signal (DRS).

6. The method according to claim 1, wherein the scheduling request is provided in accordance with one of physical uplink control channel (PUCCH) format 1a or PUCCH format 1b without hybrid automatic repeat request (HARQ) acknowledgement (ACK) information bits.

7. The method according to claim 1, wherein the scheduling request is provided in accordance with slot-based transmission utilizing physical uplink control channel (PUCCH) format 1 with an indication of the size of the grant that is requested being dependent upon the slot in which the control bit is provided.

8. An apparatus comprising:
   circuitry configured to:
      receive, at a user equipment over a plurality of transmission periods, data to be transmitted;
      buffer the received data;
      defer until a next discontinuous transmission ON period following the plurality of transmission periods a scheduling request to be provided by the user equipment via a physical uplink control channel (PUCCH), wherein the scheduling request is configured to indicate a size of the buffered data to be transmitted; and
      in response to a grant, cause the buffered data to be transmitted from the user equipment via allocated uplink resource blocks,
   wherein the scheduling request comprises a control bit and two or more additional bits that provide an indication of the size of the buffer data to be transmitted, and wherein the scheduling request is provided in accordance with a physical uplink control channel (PUCCH) format that allots a plurality of symbols in a subframe for the scheduling request.

9. The apparatus according to claim 8, wherein the scheduling request comprises an indication of whether the buffer data to be transmitted that is requested is a first size or a second size, larger than the first size.

10. The apparatus according to claim 8, wherein the scheduling request comprises an indication of a size of the buffer data to be transmitted that is requested by reference to a plurality of predefined size values.

11. The apparatus according to claim 8, wherein the circuitry is configured to-cause the apparatus to receive the data by receiving the data on a periodic basis.

12. The apparatus according to claim 8, wherein no more than a predefined number of symbols in each slot are utilized for a PUCCH demodulation reference signal (DRS).

13. The apparatus according to claim 8, wherein the scheduling request is provided in accordance with one of physical uplink control channel (PUCCH) format 1a or PUCCH format 1b without hybrid automatic repeat request (HARQ) acknowledgement (ACK) information bits.

14. The apparatus according to claim 8, wherein the scheduling request is provided in accordance with slot-based transmission utilizing physical uplink control channel (PUCCH) format 1 with an indication of the size of the grant that is requested being dependent upon the slot in which the control bit is provided.

15. A non-transitory computer readable memory storing a set of computer program instructions, which, when executed on a user equipment causes the user equipment to perform the steps of:

receiving, at the user equipment over a plurality of transmission periods, data to be transmitted;

buffering the received data;

deferring until a next discontinuous transmission ON period following the plurality of transmission periods a scheduling request to be provided by the user equipment via a physical uplink control channel (PUCCH), wherein the scheduling request is configured to indicate a size of the buffered data to be transmitted; and in response to a grant, causing the buffered data to be transmitted from the user equipment via allocated uplink resource blocks, wherein the scheduling request comprises a control bit and two or more additional bits that provide an indication of the size of the buffer data to be transmitted, and wherein the scheduling request is provided in accordance with a physical uplink control channel (PUCCH) format that allots a plurality of symbols in a subframe for the scheduling request.

16. The non-transitory computer readable memory according to claim 15, wherein the scheduling request comprises an indication of whether the buffer data to be transmitted that is requested is a first size or a second size, larger than the first size.

17. The non-transitory computer readable memory according to claim 15, wherein the scheduling request comprises an indication of a size of the buffer data to be transmitted that is requested by reference to a plurality of predefined size values.

18. The non-transitory computer readable memory according to claim 15, wherein receiving the data comprises receiving the data on a periodic basis.

* * * * *